US007005020B2

(12) United States Patent
McCain

(10) Patent No.: US 7,005,020 B2
(45) Date of Patent: Feb. 28, 2006

(54) PROCESS FOR FABRICATING OF A SPEAKER ENCLOSURE HAVING ANY PRESELECTED EXTERNAL, SHAPE CONTAINING INTERNAL CAVITIES SHAPED WITH PRESELECTED ENHANCEMENTS FOR EACH PRESELECTED DRIVER MOUNTED WITHIN SAID EXTERNAL SHAPED ENCLOSURE

(76) Inventor: Kyle McCain, 9763 Cedar Ct., Cypress, CA (US) 90630

( * ) Notice: Subject to any disclaimer, the term of this patent is extended or adjusted under 35 U.S.C. 154(b) by 0 days.

(21) Appl. No.: 10/632,193

(22) Filed: Jul. 31, 2003

(65) Prior Publication Data

US 2005/0022918 A1 Feb. 3, 2005

(51) Int. Cl.
*B32B 31/20* (2006.01)

(52) U.S. Cl. ........................ 156/64; 156/256; 156/299; 156/300

(58) Field of Classification Search .................. 156/64, 156/256, 297, 299, 300; 381/395, 388, 189; 181/148, 153, 189, 290, 291
See application file for complete search history.

(56) References Cited

U.S. PATENT DOCUMENTS 5,900,594 A * 5/1999 Monson ...................... 181/199
6,763,117 B1 * 7/2004 Goldslager et al. ......... 381/345
2003/0063766 A1 * 4/2003 Goldslager et al. ......... 381/345

* cited by examiner

*Primary Examiner*—George Koch
(74) *Attorney, Agent, or Firm*—John E. Halamka

(57) ABSTRACT

A process for the fabrication of a speaker enclosure for a set of drivers utilizing a series of templates including a base template having an external circumferential edge, corresponding to the preselected external shape of the enclosure, a preselected number of guide holes placed within said circumferential edge, a plurality of internal circumferential edges creating mounts for each driver and corresponding port. The process includes the step of calculating the volumes of cavities to enhance the sound reproduction ability of the drivers. Additional templates including the external circumferential edge and guide hole placement of the base template and further including internal circumferential edges to complete the fabrication of the cavity volume further incorporating internal supports within said cavity volumes placed whereby said supports do not inhibit the mounting of said drivers into said cavities. Assembling the layers of sheet material cut along the external and internal edges of each template into a prototype of the enclosure and testing said prototype to measure the sound reproduction capability. Adjusting selected portions of internal circumferential edges to enhance the sound reproduction ability of the drivers mounted into the enclosure to create a master set of templates. Using the master set of templates to fabricate the layers, assembling the layers in the preselected order with guide holes aligned, applying glue to at least one side of each layer, inserting reinforcing rods having threaded ends into each guide hole and installing and tightening a nut onto each threaded end of said reinforcing rods to hold the layers in the preselected external shape without deforming the layers or distorting the sound reproduction ability of the enclosure.

2 Claims, 4 Drawing Sheets

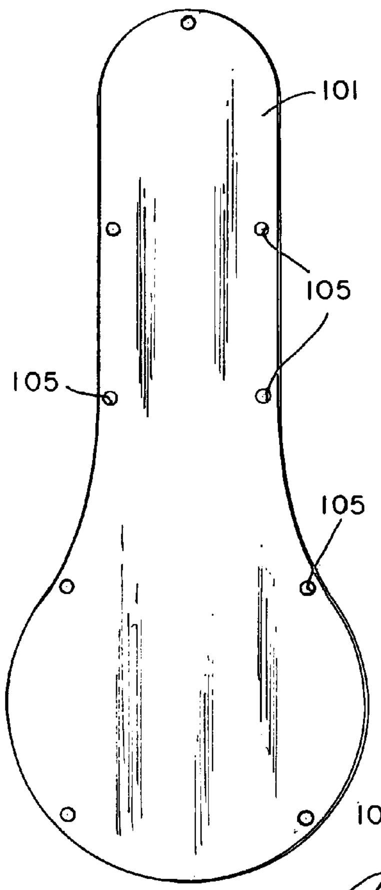
Fig. 1.
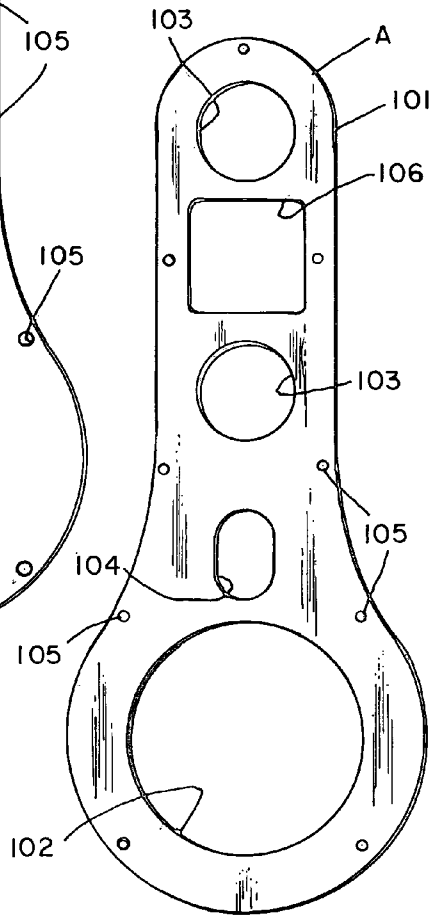
Fig. 2.
Fig. 3.
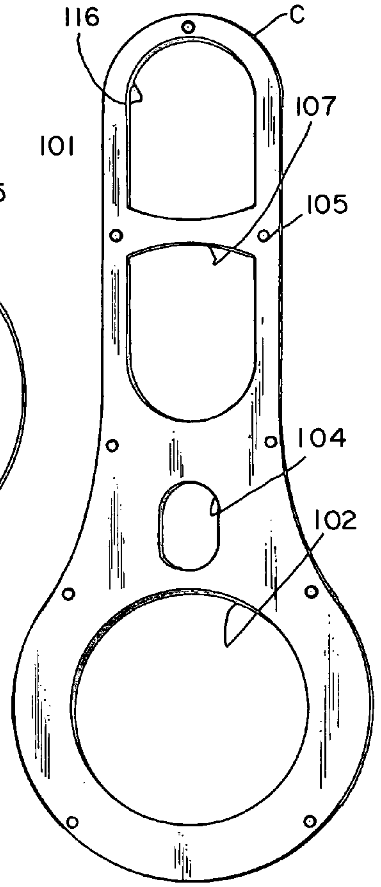

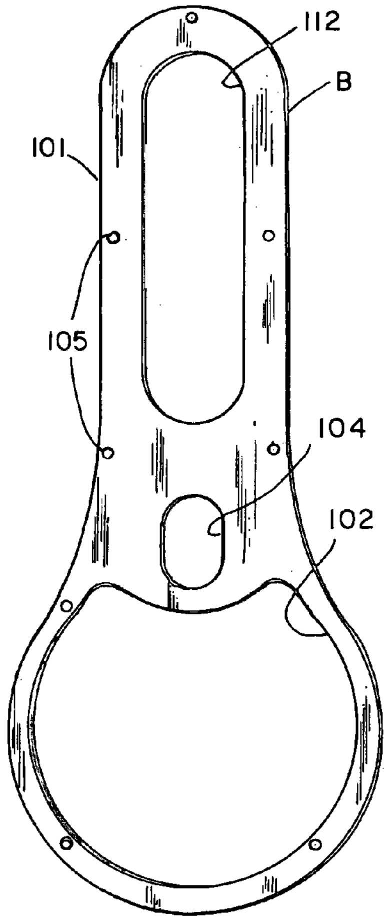
Fig. 4.
Fig. 5.
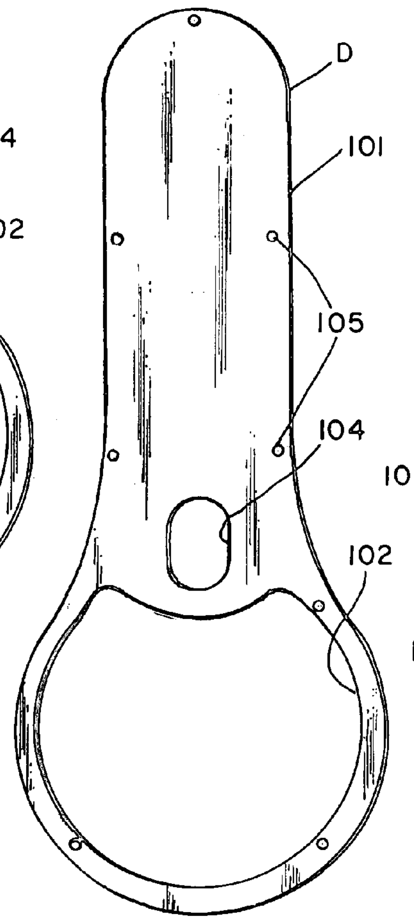
Fig. 6.
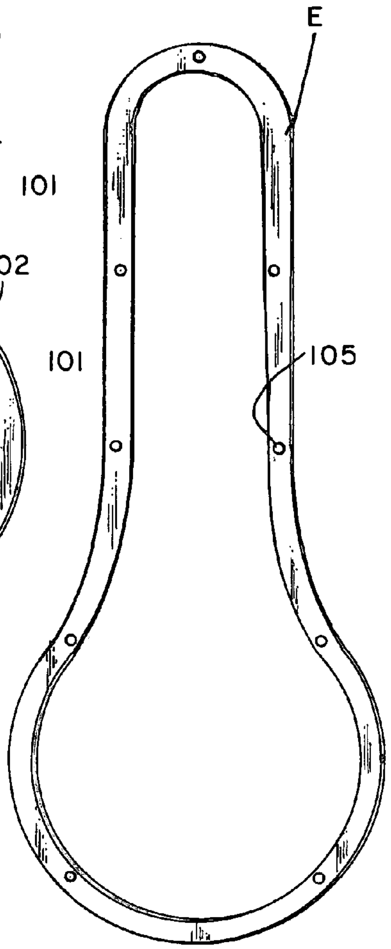

PROCESS FOR FABRICATING OF A SPEAKER ENCLOSURE HAVING ANY PRESELECTED EXTERNAL, SHAPE CONTAINING INTERNAL CAVITIES SHAPED WITH PRESELECTED ENHANCEMENTS FOR EACH PRESELECTED DRIVER MOUNTED WITHIN SAID EXTERNAL SHAPED ENCLOSURE

BACKGROUND OF THE INVENTION

1. Field of the Invention

This invention relates to the art of designing and fabricating an enclosure for a speaker driver or set of drivers and more particularly providing the ability to produce any preselected external shape of the enclosure independently of the selected driver(s) while including the fabricating of internal cavities with selected shapes and/or positioned ports and connecting channels thereby allowing said internal cavities of said enclosure to provide enhancement ability for the reproduction of sound of the selected driver(s). This application is based upon the Provisional Patent filed Jul. 31, 2002 as Ser. No. 60/400,459.

2. Description of the Prior Art

The art of designing and fabricating an enclosure for a speaker driver or set of drivers has a long history and many variations. As speaker enclosures have evolved from a simple box for one driver or for a set of drivers, the box has evolved to accommodate each driver or set of drivers. Each change in driver technology and the enhancement in performance has resulted in the inclusion of ports, open, closed or tuned, enclosures and placement of sound absorption material around or behind the speaker driver, separation of the box into compartments, and other accommodations and improvements such as supports to stiffen the box. However, none of teaching of the prior art improvements suggest substantially changing the outside shape of the box, which may also accommodate a modified inside shape as required for a driver selection. This invention solves the problem of allowing any selected outside shape to accommodate the esthetic design of the environment into which the speaker is placed as well as accommodate any inside shaping required to enhance the characteristics of the drivers selected to be incorporated into the speaker enclosure.

Of the hundreds of speaker enclosures offered, most are based upon a box incorporating the basic square, rectangle, triangle or trapezoid shape. One prior art publication describes an enclosure incorporating a curved top and a rounded bottom formed from a circular box and a rectangular box with one end rounded, both component shapes being formed of layers of material glued together. The base of the rectangular box unit is then glued to the top of the circular box unit to complete the fabrication of the enclosure. This article appeared in "SPEAKER BUILDER, THE LOUDESPEAKER JOURNAL", TWO:2000 in an article titled "Danish Delight". However, assembly of the device as taught by the article with glue is a problem because as the glue holding the layers and separate units together ages, the environment of vibration of the speakers within the separate shapes used as parts to fabricate the enclosure for the selected drivers will result in separation of the parts and the layers used to form the parts. Any separation will induce undesired vibration that will generate distortion of the sound reproduction capability of this device. This article does not even suggest any provision for supports within the individual units nor incorporating any strengthening ribs or baffles. The shapes are made from thin sheets of material that are glued together without any additional means to hold the layers together. Nor does the article provide for securely attaching the individual shapes together. As the glue becomes brittle, and as the individual units are heated and cooled in the environment the layers will expand and contract or as the units are moved and positioned within the listening environment the individual pieces will also tend to become separated. Any separation will create unwanted vibrations and distortion of the sound reproduction ability of the speaker assembly.

Another example of a speaker assembled from layers is taught by U.S. Pat. No. 5,900,594 ('594) with the technique of cutting concentric shapes from a single sheet, making the cuts at a 45 degree angle, thereafter placing the inner layer upside down on the next layer and so on and then adding another layer cut from a second board as a cap to form an enclosure. The speakers are mounted on the second board. '594 does not teach or suggest shapes beyond basic conical shapes nor does '594 suggest the addition of more that the basic chamber created by the enclosure. '594 teaches the use of glue to hold the layers together without reinforcement, baffles, or supports to prevent separation of the layers. The use of internal, concentric layers produces minimal overlap of the layers that precludes the use of reinforcement rods in the perimeter of the device to hold the layers in place.

The present invention solves these problems by teaching the integration of any shapes into a single unit that incorporates supports and baffles as well as surfaces to enhance the music reproduction all within a unified, reinforced unit that is not prone to separation of units with age thereby avoiding the production of unwanted vibration and rattles that change the sound reproduction ability of the units.

Nothing is taught by the prior art for the construction of outside shapes other than ordinary geometric shapes with sharp corners that may reflect and distort the sound.

The prior art does teach construction of layers set side by side such as a cutting board that may incorporate reinforcement to prevent splitting and warping due to moisture. However, the prior art teaching of speaker enclosures provides only limited teaching for reinforcement of the conventional boxlike construction of the enclosure to reduce vibration.

The present invention is using an old method of construction by layers for the new use in addition to the incorporation of selected outside and inside shapes as well internal supports, baffles, tuning ports, channels and equipment compartments all in a reinforced, rugged unitary unit.

Thus, there has long been a need for a method of fabrication of a speaker enclosure arrangement that allows the user to easily define an external shape for the proposed environment as well as incorporate preselected drivers.

It is desired that the method allow a full range of external and internal design to accommodate the user's unique needs.

It is further desired that the method produce identical reproductions should the user require more than one unit or even to mass-produce the unit after completion of the design stage.

It is further desired that the method allow ease of alteration to the external or internal surface to incorporate changes to enhance external appearance or to fine-tune any internal cavity or port placement for enhancement of performance without major retooling.

It is further desired that the device be produced by the method not be adversely affected by a build up of separation of individual layers due to changes in the environment such as temperature or humidity.

It is further desired that the device produced by the method not require maintenance or retightening of the reinforcement.

It is desired that a simple attachment of the speaker terminals to the output of the user's equipment and placement of the speaker units within the user's environment, adjustment of cross over network, if any, by external knobs, is provided, for such user preference characteristics as balance or tuning, be all that is required to install and use the enclosures.

It is further desired that the enclosure device produced by the method of this invention incorporate any required mechanical or electronic interface to easily adapt to and reduce losses when attached to the user's equipment.

It is further desired that the external surface of the enclosure device produced by the method of this invention be enhanced with a veneer of preselected material to present an attractive, finished, unit compatible with the other furnishings within the user's environment without detracting from the sound reproduction abilities of the device.

SUMMARY OF THE INVENTION

Accordingly, it is an object of the present invention to provide a method for integrating the fabrication of a preselected outside surface completely enclosing the chambers, channels, baffles, ribs, and stiffeners desired to support and enhance a set of preselected drivers to produce sound having preselected characteristics with a minimum of distortion and extraneous vibration.

It is an object of the present invention to provide an improved fabrication method that allows the user to initially adjust any of the elements of the enclosure and thereafter allow the user to duplicate the entire design to create matched sets that do not require any further response testing or adjustment to any of the elements.

It is a further object of the present invention to provide an enclosure having an outside surface with a preselected finish and appearance that is compatible with other furnishings within the users environment.

It is another object of the present invention to provide a method of fabrication that produces an end product that may be repositioned within the users environment and that resists separation of individual layers due to changes of temperature and humidity within the users environment.

It is yet another object of the present invention to provide a method of fabrication of the external shape desired by the user that incorporates the set of drivers compatible with the user's requirement for power generation and frequency response in as many identical or similar units as desired by the user.

It is further desired that the user not be required to adjust the support, reinforcement or characteristics of the device to maintain the desired frequency response other than simply adjust any external knobs to change the settings of internal crossover electronics or other similar elements incorporated in the device after attachment of the input signal as provided by the user's equipment to the externally mounted terminals for the drivers.

The above and other objects of the present invention are achieved, according to a preferred enbodiment thereof, by providing an improved method of fabrication by means of individual layers of preselected thickness and circumference shape. Each layer further incorporating internal cutouts and alignment guide holes such that the assembly of the layers by alignment of the guide holes from layer to layer creates the desired outside shaped surface and includes preselected internal chambers, baffles, supports, tuning ports, equipment compartments and channels all in a unified device capable of sound reproduction under the condition of the user positioning the device within the user's environment and applying audio signal to the external terminals mounded on the device.

A further step of applying an additional front layer incorporating screen and a layer of veneer to the other surfaces may be added to the assembly to produce a finished, furniture-looking device.

The present invention is an improved fabrication method using a plurality of templates as a pattern to reproduce the device, each template corresponding to a "slice" of the object to be fabricated. The thickness of the "slice" or layer generally corresponds to the thickness of the sheet stock from which the layer is cut. The preselected external circumferential shape edge and preselected internal circumferential edges is applied to each template. The cutting of the sheet stock along the applied edges may be made by band saw, automated router machine, laser or other cutting method to produce a clean cut without raised edges that may interfere with the side-by-side assembly of layers. If any raised edges appear in the process, they should be sanded smooth to insure each layer will tightly fit next to the adjacent layer. The angle of the cut through the stock may be at 90 degrees or beveled at an angle so that as the layers are assembled side by side and the edges are in general alignment. In the preferred embodiment the angle of cuts of external or internal circumferential edges are preformed at a 90 degree angle to the parallel surfaces of the sheet material. Further, the external and internal circumferential edges are aligned within 1/32 of an inch from one to another adjoining template sheet. Thus, the external and internal circumferential edges as the templates are assembled side-by-side form as a smooth curved surface rather than a step-wise approximation of the desired internal or external surface. Of course, if a complex shape is desired at some portion of the interior or external circumferential edge, a thinner stock utilizing more layers may be utilized to assemble the object with smother assembled edge surfaces without the need for beveling or extensive edge processing after assembly of the layers.

In the preferred method, the method uses a number of templates forming each layer to define the external circumferential shape and any internal cutouts to define the internal circumferential shape of cavities, channels as well as supports and alignment guide holes. The templates are used to pattern a specific layer or slice of the desired final device. The layers are assembled by alignment of the alignment guide holes and thereafter a metal shaft having threaded ends and a nut on each end is inserted within the alignment guide holes to apply pressure to the layers by means of tightening the nuts thereby holding the layers together. This method allows the present invention to adept the outside shape and internal chambers and channels to reproduce music.

BRIEF DESCRIPTION OF THE DRAWINGS

The above and other embodiments of the present invention may be more fully understood from the following detailed description, taken together with the accompanying drawings, wherein similar reference characters refer to similar elements throughout, and in which:

FIG. 1 is a plane view of a general shaped template of the preselected desired external circumferential shape with guide holes;

FIG. 2 is a plane view of a general shaped template with guide holes and internal circumferential shapes for cavities and channels;

FIG. 3 is a plane view of a general shaped template with guide holes and internal circumferential shapes for cavities, channels and supports;

FIG. 4 is a plane view of a general shaped template with guide holes and an internal circumferential shape for a separation layer;

FIG. 5 is a plane view of a general shaped template with guide holes, an internal circumferential shape for a port but no other internal circumferential shapes for an internal termination layer;

FIG. 6 is a plane view of a general shaped template with guide holes and a general internal circumferential shape for a separation layer;

DESCRIPTION OF A PREFERRED EMBODIMENT

Figure 7:
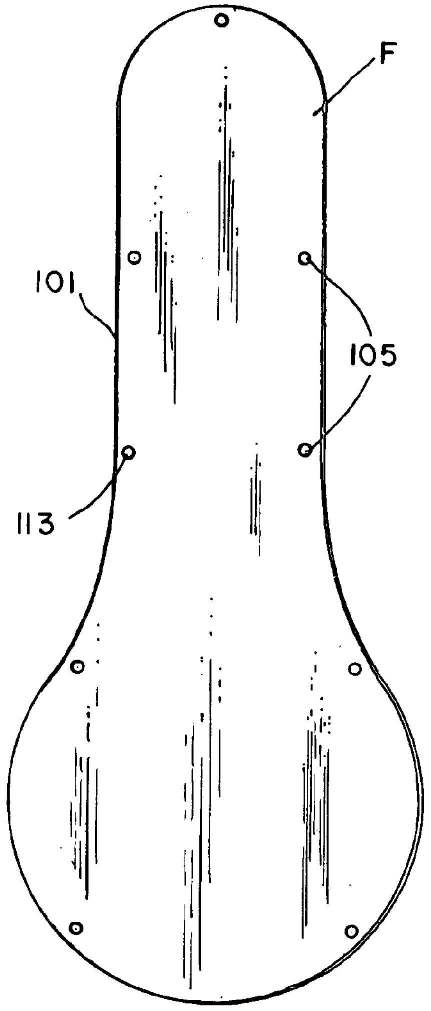
FIG. 7 is a plane view of a general shaped template with countersunk guide holes and no internal circumferential shape for a termination layer.

Referring now to the drawing, FIG. 1 shows the general circumferential shape 101 preselected to be the external shape of the enclosure fabricated according to the teaching of this invention. A preselected number of guide holes 105 are marked on this general template.

FIG. 2 shows the general template with internal circumferential shapes for a woofer cutout edge 102, mid-range cutouts edges 103, a port cutout edge 104 and a tweeter cutout edge 106 for the preselected set of drivers to be mounted within the assembled enclosure. The guide holes 105 set out on the general template of FIG. 1 are applied to the template of FIG. 2 to assist in alignment of the templates into the final assembled enclosure.

FIG. 3 shows the general template with guide holes 105 and an internal support 107 placed between chambers formed by internal circumferential edges 116 so as to not interfere with the mounting of the mid-range and tweeter drivers within the chamber formed by internal circumferential edges 103 and 106 respectively. Internal circumferential edge 104 continues the formation of the port chamber and internal circumferential edge 102 continues the formation of the chamber into which the woofer driver is to be mounted.

FIG. 4 shows the general template with guide holes 105, a continuation of the internal circumferential edge 104 forming the port and internal circumferential edge 102 forming the chamber for the woofer with a general internal circumferential edge 117 that forms an internal chamber behind the mid-range mounting edges 103 and tweeter mounting edges 106 to form the preselected volume to enhance the performance of the preselected drivers.

FIG. 5 shows the general template with guide holes 105, a continuation of the internal circumferential edge 102 for the woofer chamber and internal circumferential edge 104 for the port but no other internal circumferential edges to terminate the formation of the chamber tuned for the mid-range and tweeter drivers.

FIG. 6 shows the general template with guide holes 105 and only one general internal circumferential edge 109 to be used as a spacer layer to extend the chambers initiated for the port by edge 104, for the woofer by edge 102, for the mid-range by edge 103 and for the tweeter by edge 106 as required to produce the preselected chamber volumes to enhance the music reproduction of the preselected set of drivers mounted within the enclosure.

FIG. 7 shows the general template with guide holes 105 that may be countersunk with edges 113. No internal circumferential edges are cut into this template so that it may be used as a terminal layer for the back of the enclosure.

Figure 8:
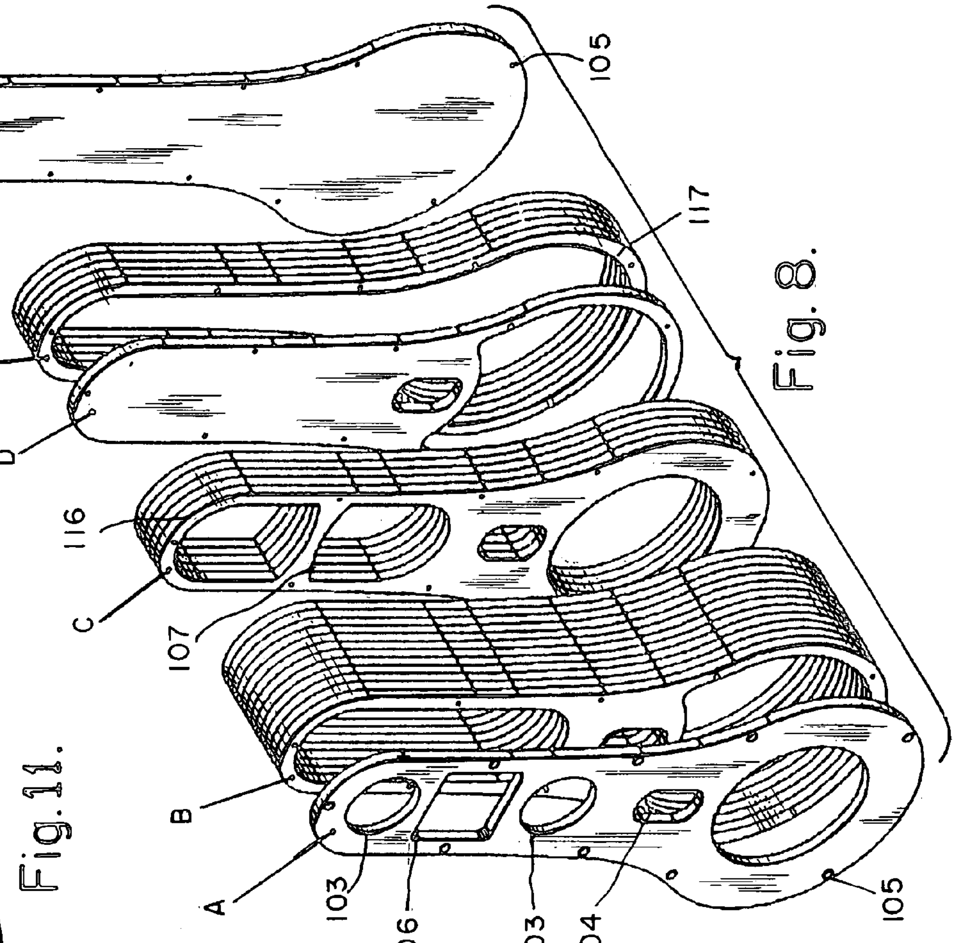
FIG. 8 is a perspective view of general shaped template layers with guide holes aligned showing internal cutouts forming channels, cavities, ports, supports and termination layers.

FIG. 8 is a perspective view of multiple layers placed side by side for assembly. The layers may be assembled in this order or may be rearranged into another order as the testing for response of the enclosure is conducted. However, the general order is a front layer as depicted in FIG. 2 labeled (A), a terminal layer as depicted in FIG. 7 labeled (F) and intermediate layers labeled (B), (C), (D) and (E) forming the internal cavities, ports and channels with supports all spaced apart and aligned with the guide holes 105. Another possible arrangement of layers shown in FIG. 8 is A, B, B, B, C, B, B, B, C, B, B, B, C, B, B, B, D, B, B, E, C, E, E, E, F, F that is used in the preferred embodiment of this device.

Figure 11:
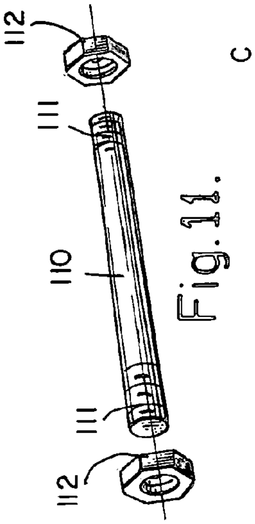

As shown in FIG. 8, the individual layers of the stack 101 have a preselected circumferential shape 101 that defines the external shape of the enclosure. The internal guide holes 105 assist in the assembly of the enclosure. Alignment of the guide holes 105 in each of the adjacent layers forms the preselected external shape and preselected internal chambers and channels. A plurality of reinforcing rods 110 shown in FIG. 11, having threaded ends 111 are inserted into each guide hole to assist the alignment of the layers and the assembly of the enclosure. A thin layer of glue is applied to at least one flat side of each layer before being set on the guide rods and adjacent a previously set layer. The guide holes in the top and bottom layers may be counter sunk as shown in FIG. 7 to accommodate the nut applied to each end of the guide rods and under the condition of the last layer being assembled the nuts tightened to hold the layers together while the glue dries. After the final tightening, the nuts may be sealed to the ends of the guide rods.

Figure 9:
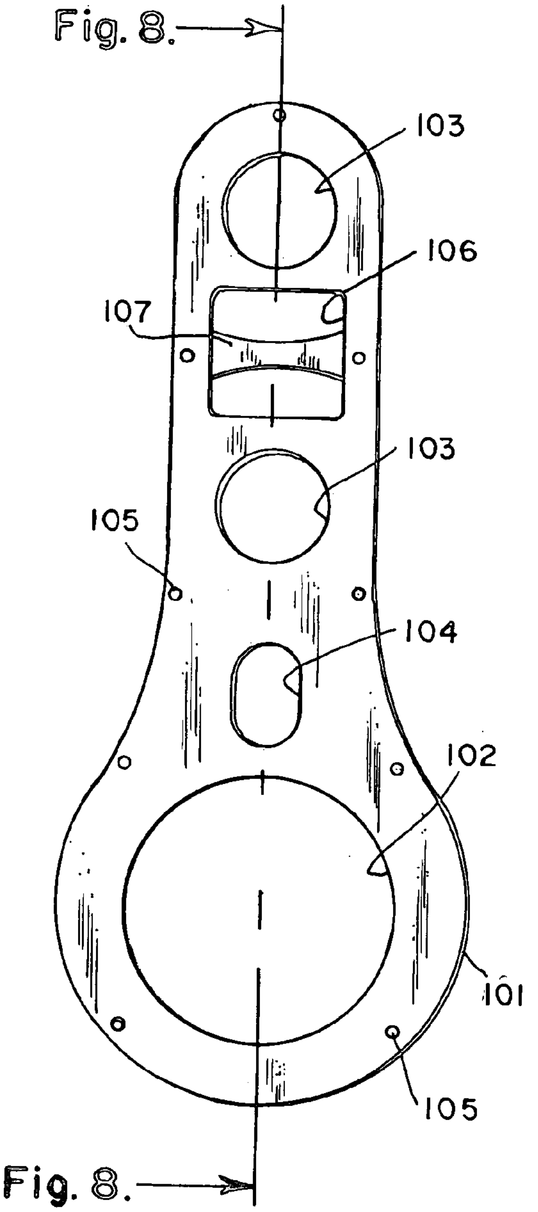
FIG. 9 is top view of FIG. 8 of assembled layers.

FIG. 9 shows a top view of the stack of layers shown in FIG. 8.

Figure 10:
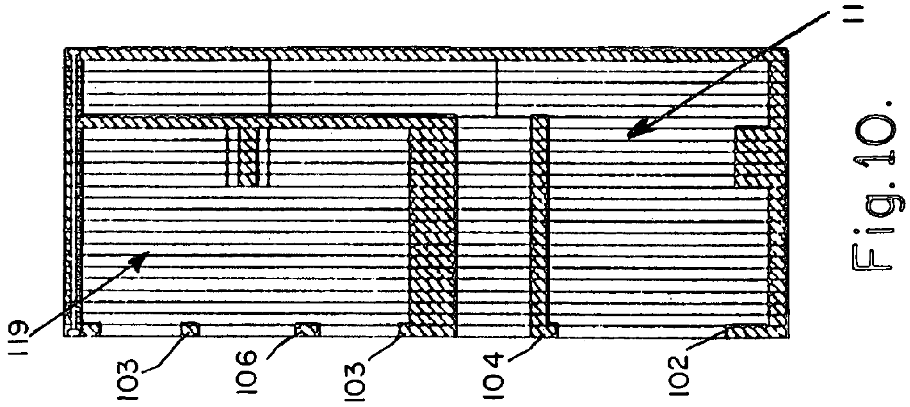
FIG. 10 is a cross sectional view of FIG. 9 along a—a of the assembled layers; and, FIG. 11 is a perspective view of the reinforcing bar with threaded ends.

FIG. 10 is a cross-section of the stack of layers taken along line a—a showing the formation of the tuned base chamber 118 and the tuned mid-range and tweeter chamber 119.

A layer of mesh or speaker cloth may be applied to the outside surface of layer A. In the preferred embodiment, a thin frame fabricated to be conforming with circumferential edge 101 is covered with speaker cloth and opposing hook and loop material are applied to the frame and to layer A to removably attach the speaker cloth over the preselected set of speakers mounted within the enclosure.

If a crossover network is desired to enhance the sound reproduction ability of the preselected set of drivers, the electronics are designed using well known prior art methods. The electronics for the crossover network may be mounted on an integrated circuit board along with internal connections to the drivers and external connections accessible to the user to attach the user's sound generation equipment. The integrated circuit board is mounted on layer F.

In the preferred embodiment, each layer is fabricated of three-quarters inch MDF with adjacent circumferential layer edges, external or internal formed within 1/32 of an inch of adjacent layer circumferential edges thereby forming relatively smooth edge surfaces upon stacking the layers in the preselected order.

In the preferred embodiment, the layers are cut with a band saw, laser, or router to produce a sooth edge without any raised portions. To insure that adjacent layers fit tightly, after cutting, each layer may be edge sanded to remove any protrusions that may cause separation of any portion of the adjoining surfaces of the layers.

The first step in the process is to create a general shape template such as that depicted in FIG. 1 having the preselected external circumferential edge 101. This process is similar to taking a cross-section of an object that defines the preselected outside shape of the enclosure. A plurality of guide holes 105 is applied to this general template with preselected spacing between the guide holes having the guide holes spaced apart from the circumferential edge defining the outside shape of the enclosure and any internal shapes. The layout of the guide holes 105 is applied to each of the other templates to insure alignment of each successive layer.

The nominal layers may be called a front cap and a back cap separated by a preselected number of layers that may be called hollow layers, cross-brace layers, compartment layers, combination cross-layer and compartment layers, and compartment cap layers. Each layer having a circumferential shape 101 similar to the general shape template and having the guide holes 105 marked on each template. The guide holes 105 are formed as 1/8-inch holes positioned a nominal distance of 1/4 to 2 inches from the outside edge generally centered between the external and internal circumferential edges. The number and placement of the guide holes 105 is selected to create essentially even intervals between adjacent guide holes 105 and placed on a non-interference basis with internal chambers and channels as well as to not weaken baffles, supports or covers. In the preferred embodiment, the guide holes 105 are spaced 10 to 12 inches apart.

The most important internal cavities are the separate compartments for the drivers 118 and 119. Each driver has a set of theil-small parameters and serves a different purpose for the overall sound generation. The calculation of the cavity volume may be performed by methods well known in the art. Each cavity 118 and 119 should be tuned to produce a flat frequency response for the driver mounted in that cavity. With this method, a test module may be produced, assembled and test module subjected to measurement of sound reproduction capability using known acoustical methods. Corrections to the cavities 118 and 119 may then be calculated and the internal shape of the templates forming the cavities adjusted to form the desired tuned cavity shape all without major rework of the entire design and disruption of the external shape 101. This final set of templates is then used to exactly reproduce the desired, tested and tuned device.

The process of adding sound absorbing material within a speaker enclosure is well known in the art and may be used to further enhance the sound reproduction ability of the individual drivers preselected to be mounted within the enclosure fabricated by the method disclosed by this invention.

A solid divider layer should terminate the internal cavities. Thus, an opening for a shaped cavity may be initiated in any layer, the number of layers having this opening is continued until the cavity is formed of the preselected volume and the resulting volume tested and tuned as above. A solid layer is then used to cap the cavity and separate the cavities formed in subsequent layers. In the preferred embodiment, the exact volume desired for a driver is calculated using, available software programs. The placement of the drivers with the tuned cavities is selected whereby the cavities do not overlap on the inside nor cause a breach of the outside surface other than the opening in the outside surface into which the driver is mounted.

Should the placement of the tuned cavities tend to create structural integrity issues, a preselected layer may be formed to include supports 107 for cross bracing at preselected positions. In the preferred embodiment the cross bracing is placed in the compartment divider layers in order to provide structural integrity yet not interfere with the volume of the internal cavity nor restrict the mounting of the drivers within the opening of the cavities.

In the preferred embodiment, the individual layers are cut from 3/4 inch medium-density fiberboard (MDF) chosen to be strong and to resist warping, twisting or uneven expansion and contraction.

Upon gluing and assembly of the layers as aligned on the guide rods 110 inserted within the guide holes 105, tension is applied to the layers by tightening of nuts engaged on the threaded ends 111 of the guide rods 110 to produce even compression so as to not warp or distort portions of the device.

The nuts are tightened sufficiently to hold the layers in alignment, especially while the glue dries. No further adjustment to the nuts should be necessary. Upon drying of the glue, the nuts may be sealed to the ends of the guide rods 110 to prevent loosening from the ends of the guide rods 110 and release of the tension.

By using the method taught by this invention the user may assembly a unitary enclosure that includes internal chambers, channels, supports and baffles. In the prior art if an internal wall needed to be added to the enclosure device, it was accomplished by the addition of additional structure secured to the existing internal walls of the device. If the placement of this additional internal wall mal-affected the sound reproduction ability, the device had to be disassembled and the internal wall remounted and the external surfaces reassembled.

With the present invention, the internal supports, baffles, reinforcements and channels are formed as an integral part of the construction and firmly held in alignment by the guide rods 110. Once assembled, these internal layers will not become dislodged.

After the layers have been assembled, the resulting inside surface may be sanded to produce a smooth surface. The outside surface may be particularly sanded smooth to produce a surface upon which a veneer layer of preselected finished may be glued. In the preferred embodiment, the veneer is glued with heat-activated glue that produces a strong, seam free covering. This external veneer may be fabricated to have a grain and color to complete the furniture like appearance of the enclosure device.

Since certain change may be made in the above apparatus without departing from the scope of the invention herein involved, it is intended that all matter contained in the above description, as shown in the accompanying drawing, shall be interpreted in an illustrative, and not a limiting sense.

What is claimed is:

1. A method for fabrication of an enclosure device for a preselected set of speaker drivers, said enclosure having any preselected external shape and including internal cavities and channels formed to enhance the ability of said drivers to reproduce sound with preselected characteristics, the method comprising the steps of:

selecting said external shape and forming an outline of an external circumferential edge to create a base template;

placing an the outline of the internal circumferential edges of said drivers within said external circumferential edge outline of said base template;

placing a plurality of guide holes within said internal circumferential edge;

calculating a volume for the driver chambers and supporting ports;

selecting a number of said base templates required to produce a desired volume of chambers and ports;

outlining said internal circumferential edges of said drivers and said guide holes on each of said base templates whereby said base template external on one end has openings into which said preselected drivers may be mounted, said base template external on the opposing side terminates the driver chambers and said base templates spaced apart said external opposing base templates thereby creating the desired chamber volume and ports;

outlining the circumferential edges of internal supports to strengthen and stabilize said enclosure, the placement of said internal supports being selected whereby said drivers may be fully inserted within said enclosure without being limited by said supports;

applying each template outline of external circumferential edges and internal circumferential edges to preselected sheet stock;

cutting each layer of sheet stock along said circumferential edges;

calculating the desired characteristics of a (the) supporting crossover network for said drivers;

fabricating said crossover network with said characteristics and terminating said network with connectors for each driver and for externally applied user supplied input;

mounting said crossover network to a selected layer whereby said driver connectors are internally accessible to attach to said drivers upon the condition of said drivers mounted within said enclosure and said externally applied user supplied input is externally accessible;

inserting a reinforcing rod having threaded ends within each guide hole of an external layer;

applying adhesive to at least one side of each adjacent layer between said external layer and inside of opposing external layer;

assembling layers in preselected order by inserting said reinforcing rods through each successive layer terminating with said opposing external layer;

applying a nut to each said threaded ends of said reinforcing rods and tightening each of said nuts thereby compressing said layers without deforming said layers or distorting the sound reproduction characteristics of said enclosure;

mounting said selected drivers within said enclosure, attaching the terminals of each driver to the corresponding internal connections of said crossover network;

applying a preselected veneer to the external surface of said assembled enclosure; and, applying a speaker cloth layer over said speaker drivers.

2. The method of claim 1 further comprising the steps of:

testing said assembled templates for sound reproduction characteristics; and, adjusting selected circumferential edges to create desired response of enclosure and drivers.

* * * * *